A. S. DYSART.
STEERING WHEEL.
APPLICATION FILED JUNE 5, 1916.

1,216,670.

Patented Feb. 20, 1917.
2 SHEETS—SHEET 1.

Inventor
Arthur S. Dysart

Witness

By
His Attorney

A. S. DYSART.
STEERING WHEEL.
APPLICATION FILED JUNE 5, 1916.
1,216,670.
Patented Feb. 20, 1917.
2 SHEETS—SHEET 2.
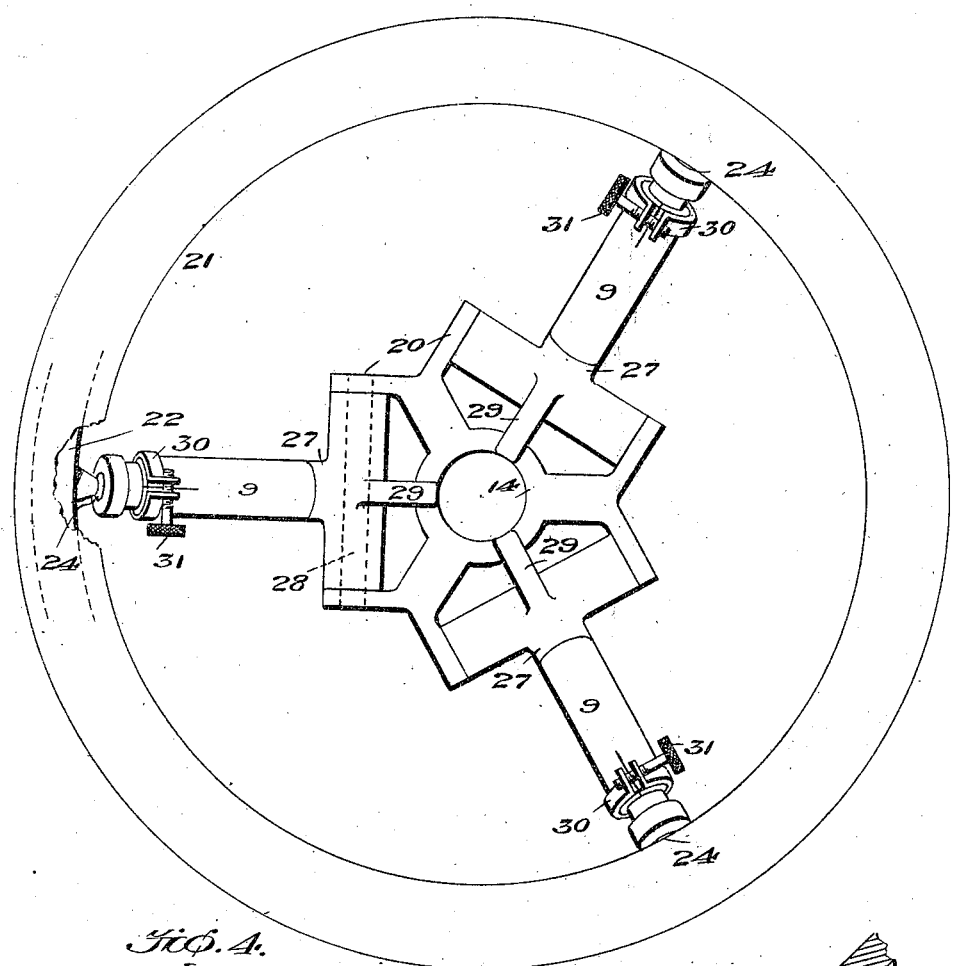
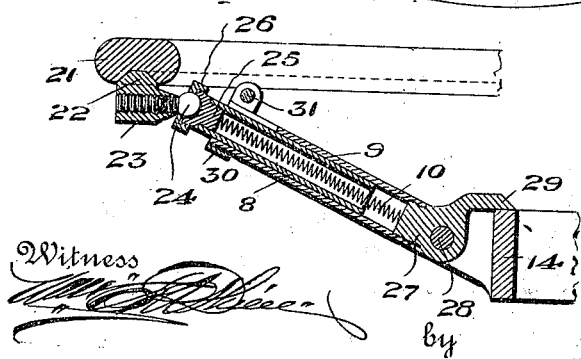
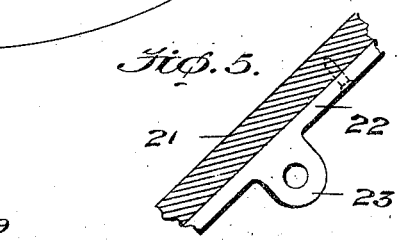
Inventor
Arthur S. Dysart

UNITED STATES PATENT OFFICE.

ARTHUR S. DYSART, OF THE UNITED STATES NAVY.

STEERING-WHEEL.

1,216,670.  Specification of Letters Patent.  Patented Feb. 20, 1917.

Application filed June 5, 1916. Serial No. 101,759.

*To all whom it may concern:*

Be it known that I, ARTHUR S. DYSART, lieutenant in the United States Navy, a citizen of the United States, have invented certain new and useful Improvements in Steering-Wheels, of which the following is a specification.

This invention relates to steering wheels.

My object is to provide an improved tilting steering wheel for motor vehicles, motor launches and the like which will be rigidly connected to the steering stem or shaft when in use and may be quickly tilted or folded for the purpose of lessening the horizontal space it occupies so as to permit easy access to, or passage from, the driver's seat.

Three or more spokes may be used and modifications resorted to in carrying out the essential principles of the invention, those forms which are set forth hereinafter and disclosed in the accompanying drawings being illustrative, and not restrictive, of the scope of the invention.

Figure 1:
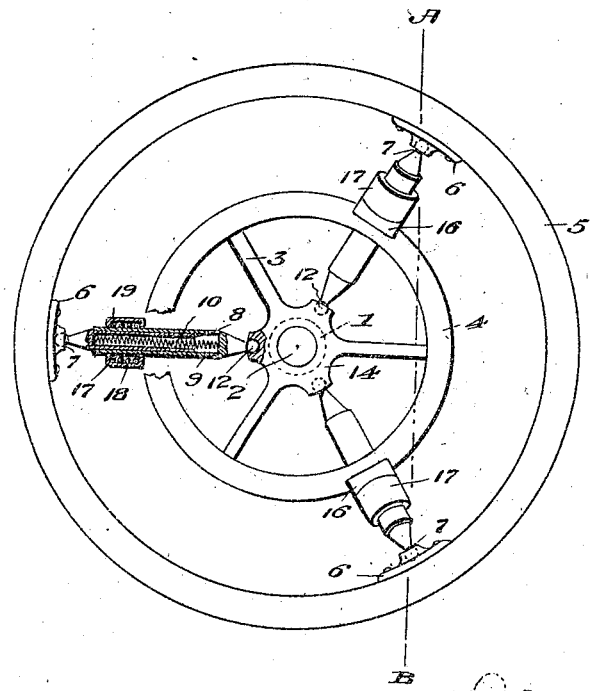
Figure 2:
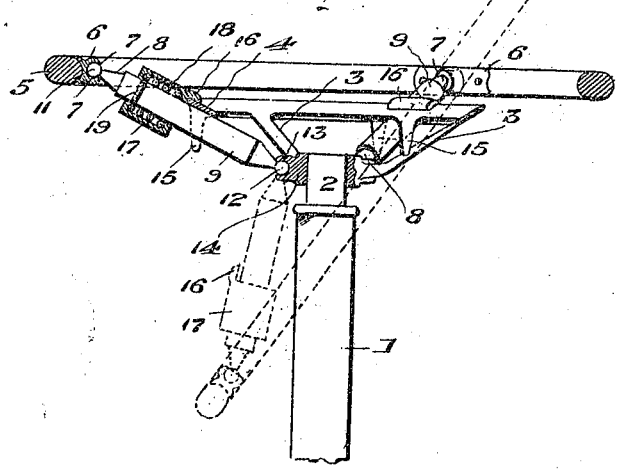

In the accompanying drawings:

Figure 1 is a plan view, partly broken away and in section, showing the wheel in its locked position;

Fig. 2, a side elevation, partly in section, full lines representing the locked position of the wheel, and dotted lines its folded or tilted position;

Fig. 3, a plan view of a modification;

Fig. 4, a detail section through one of the spokes and its connections; and

Fig. 5, a detail of a portion of the metal base of the wheel.

Referring first to Figs. 1 and 2, the hollow steering post is shown at 1 and the steering shaft at 2.

Secured to the steering shaft 2 in any suitable manner is a spider 3 which has an inclined, annular rim 4.

The steering wheel or hand-grip rim 5 may be of wood, as usual. To this rim there is secured the metal socket pieces 6 which have ball concavities 7. Any preferred or desired separable, or other, construction may be employed for the socket pieces 6 to enable the ball ends of the spokes to be entered therein.

The spokes are composed of telescopic sections 8 and 9, within which are stout expansion coil springs 10 tending to force the sections 8 and 9 outwardly in relation to each other. The sections 8 have ball ends 11 received in the ball sockets 7. The sections 9 have ball or knuckle ends 12 received in corresponding sockets or joints 13 in the center piece 14 of the spider 3.

Depending from the rim 4 of the spider 3 are pairs of lugs or ears 15, the members of which are spaced apart a distance just sufficient to permit the entry of the spokes therebetween to thus lock the spokes to the spider 3 as regards horizontal movement.

To lock the spokes to the spider 3 so that vertical movement of the steering wheel 5 is impossible, there are provided latches 16 having rounded upper faces and carried by sleeves 17 which slide on the sections 9 and are pressed toward the rim 4 by coil springs 18 bearing against collars 19 on the said spoke sections 9.

As shown by full lines in Figs. 1 and 2, when the latches 16 overlie the rim 4 and the spokes 9 lie between the pairs of lugs or ears 15, the steering wheel is locked to the shaft 2 and cannot move independently either horizontally or vertically.

When it is desired to tilt the wheel, as shown by dotted lines in Fig. 2, the latch 16 nearest the driver is released from the rim 4, whereupon, turning on the axis A, B, (Fig. 1) the steering wheel may be folded or tilted downwardly, the spring 10 of the depressed spoke first being compressed by the contraction of that spoke, then extending the telescopic sections 8, 9, thereof.

On raising the depressed portion of the wheel, the spoke section 9 first passes in between the pair of ears 15 and then the rounded upper face of the catch 16 bears against the lower, inclined face of the rim 4 and is pressed back and finally snaps over the upper face of said rim, thus locking the steering wheel.

In this form of the invention, it is not essential that the springs 10 be employed in the telescopic spokes and I do not intend to limit myself thereto, but it is preferable to use these springs.

Referring to Figs. 3, 4 and 5, the spider 3, 4, is dispensed with and the hub 14 is provided with pairs of ears 20 which are spaced apart a sufficient distance to afford relatively long joints between the spokes and the said hub to afford great rigidity against lateral play. In this form of the invention, the hub 14 serves the double purpose of a pivotal connection for the spokes and as a substitute for the spider, inasmuch as the locking action is directly on top of the said hub 14. The long joints between the spokes and the hub 14 obviate the necessity of providing the lugs 15 of the form shown in Figs. 1 and 2.

The wooden rim or wheel 21 is carried by and secured to an annular, metal wheel or rim 22 which has internally screw-threaded ears 23 (Fig. 5) corresponding to the number of spokes. Screwed into the ears 23 are the ball joint members 24 which are connected to the inner spoke sections 8 by a concaved or socketed plug 25 screwed into the end of the section 8, and a cap 26 screwed on to the plug 25. The spoke sections 9 telescopically receive the sections 8, as in Figs. 1 and 2, and a spring 10 contained within the spoke sections, is adapted to relatively expand them. The hinge member 27 which screws into the lower end of the spoke 9, is relatively long and pivoted on a stout pin or bolt 28 which is secured to the ears 20. A latch or finger 29, integral with the hinge member 27, is pressed down firmly on the upper face of the hub 14 by the expansion of the spring 10 when the wheel is in normal position, thus preventing any lost motion of said steering wheel in a vertical plane. The hinge joint composed of the parts 27, 28, is of such length that it will transmit a relatively great torque from the rim 21 to the hub 14 without perceptible wear or looseness. The expansion of the springs 10 in the respective spokes is sufficient to keep the steering wheel rigid, but if it is desired, additional means may be employed for that purpose, such means consisting of splitting the upper ends of the sections 9 and applying thereto a clamp 30 which may be screwed onto the spoke section 9 and also provided with a tension thumb-screw 31 by which the spoke 9 may be firmly clamped around the spoke section 8.

In the claims, when referring to "the center section" of the steering wheel, I intend to cover the locking of the spokes by either the latch 16 of Figs. 1 and 2, or the members 29 of the remaining figures, such expression being intended to cover the hub 14 alone or the hub 14 and the spider 3, 4, as in both forms of the invention, the spokes are held rigid with the center section or hub 14, that is, the part which connects the wheel to the steering shaft 2.

Having thus described my invention, what I claim as new and desire to secure by Letters Patent, is:—

1. A foldable steering wheel adapted to be tilted from normal to folded position, and vice versa, having a center section, a rim or hand-wheel portion, and a plurality of spokes comprising telescopic sections whose ends are jointed to the center section and to the rim which permit tilting of the wheel.

2. A foldable steering wheel adapted to be tilted from normal to folded position, and vice versa, having a center section, a rim or hand-wheel portion, and a plurality of spokes comprising telescopic sections whose ends are jointed to the center section and to the rim which permit tilting of the wheel, and spring means for relatively extending or expanding the telescopic sections of the respective spokes.

3. A foldable steering wheel adapted to be tilted from normal to folded position, and vice versa, having a center section, a rim or hand-wheel portion, and a plurality of spokes comprising telescopic sections whose ends are jointed to the center section and to the rim which permit tilting of the wheel, and means for holding the steering wheel rigid when in normal position.

4. A foldable steering wheel adapted to be tilted from normal to folded position, and vice versa, having a center section, a rim or hand-wheel portion, and a plurality of spokes comprising telescopic sections whose ends are jointed to the center section and to the rim which permit tilting of the wheel, spring means for relatively extending or expanding the telescopic sections of the respective spokes, and means for holding the steering wheel rigid when in normal position.

5. The combination with a center or steering-shaft-attaching section of a steering wheel, of a steering rim or hand-wheel portion thereof, spokes comprising telescopic sections which are respectively jointed to the center section and the steering rim section, and means for engaging the spokes with the center section.

6. The combination with a center or steering-shaft-attaching section of a steering wheel, of a steering rim or hand-wheel portion thereof, spokes comprising telescopic sections which are respectively jointed to the center section and the steering rim section, springs for expanding the sections of the telescopic spokes, and means carried by the spokes for engaging the center section.

7. A foldable steering wheel adapted to be tilted from normal to tilted position and vice versa, having a center section, a rim or hand-wheel portion, and a plurality of spokes jointed to the center section and having universal joints connecting them to the rim.

8. A foldable steering wheel adapted to be tilted from normal to tilted position and vice versa, having a center section, a rim or hand-wheel portion, and a plurality of spokes comprising relatively movable sections respectively jointed to the center section and to the rim which permit tilting of the wheel.

In testimony whereof, I hereunto affix my signature.

ARTHUR S. DYSART.